Sept. 23, 1930.     M. CHARLES     1,776,488
HYDRAULIC BRAKING APPARATUS
Original Filed June 8, 1925
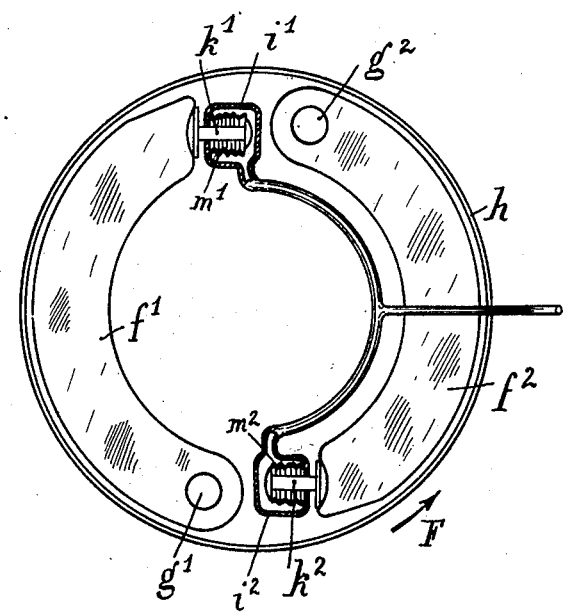

Patented Sept. 23, 1930

1,776,488

UNITED STATES PATENT OFFICE

MAURICE CHARLES, OF COURBEVOIE, FRANCE

HYDRAULIC BRAKING APPARATUS

Original application filed June 8, 1925, Serial No. 35,740, and in France April 9, 1925. Divided and this application filed June 25, 1928. Serial No. 288,200.

My invention relates to hydraulic braking apparatus of the type described and claimed in my co-pending application Serial No. 35,740 filed June 8, 1925.

One of the objects of my invention is to provide an improved braking arrangement of the character indicated in the application, above mentioned, of which the present application is a division, in which two brake segments participate in the braking by equal amounts.

Other objects of my invention will be obvious to those skilled in the art in the following description with reference to the accompanying drawing given by way of example and in which the single figure represents an elevational view of a brake with parts in section constructed in accordance with my invention.

Adverting to the drawing, two brake segments $f^1$ $f^2$ are pivotally mounted on studs $g^1$ $g^2$ respectively, said two studs being disposed diametrically opposite. The brake segments $f^1$ $f^2$ are controlled by two pistons $k^1$ $k^2$ sliding in cylinders $i^1$ $i^2$ respectively which as shown are receiving cylinders. Said receiving cylinders $i^1$ $i^2$ correspond to similar cylinders described and claimed in my co-pending application, above cited. In each of said cylinders are arranged fluid-tight bellows $m^1$ $m^2$ each acting to transmit power through the respective ends thereof which play the part of piston-heads.

The advantages of this arrangement and the control of the brake shoes will be obvious from the figure. If the wheel carrying the brake drum $h$ turns in the direction of the arrow F, the free ends of both brake shoes are applied in the same direction to said drum during braking, in such fashion that the friction created between the drum and the brake shoes tends to expand the said brake shoes from their initial position and thus increase the braking action.

While I have disclosed what I deem to be the preferable form of my device I do not wish to be limited thereto as there might be various changes made in the construction and arrangement of parts without departing from the spirit of my invention as comprehended within the scope of the appended claims.

Having described my invention what I claim as new and desire to secure by Letters Patent is—

1. A hydraulic brake of the type described comprising, a hollow cylindrical brake drum, an arcuate brake shoe pivoted at one end within said drum, a second arcuate brake shoe pivoted at the end diametrically opposite the pivot point of said first brake shoe and fluid actuated means for each of said brake shoes associated with the free end thereof adapted to swing each of said shoes about the respective pivot thereof in the direction of said drum.

2. A hydraulic brake of the type described comprising, a hollow cylindrical brake drum, an arcuate brake shoe pivoted at one end within said drum, a second arcuate brake shoe pivoted at the end diametrically opposite the pivot point of said first brake shoe, a fluid receiving cylinder for each of said shoes, a piston in each of said cylinders adapted to expand its respective brake shoe with respect to said drum and a fluid tight bellows sealing each of said pistons to its respective cylinder.

3. A hydraulic brake of the type described comprising, a hollow cylindrical brake drum, an arcuate brake shoe pivoted at one end within said drum, a second arcuate brake shoe pivoted at the end diametrically opposite the pivot point of said first brake shoe, a fluid receiving cylinder for each of said shoes, a piston in each of said cylinders adapted to expand its respective brake shoe with respect to said drum, a fluid tight bellows sealing each of said pistons to its respective cylinder and a common means for supplying a fluid to said cylinders exterior of said pistons and said sealing bellows.

In testimony whereof I have signed this specification.

MAURICE CHARLES.